United States Patent
Nakamura et al.

(10) Patent No.: US 8,765,300 B2
(45) Date of Patent: Jul. 1, 2014

(54) BATTERY MANUFACTURING METHOD, BATTERY, PRE-WELDING POSITIVE PLATE MANUFACTURING METHOD, AND PRE-WELDING POSITIVE PLATE

(75) Inventors: Hideo Nakamura, Toyota (JP); Yoshinori Shibata, Nagoya (JP); Toru Sugiyama, Aichi-ken (JP); Takahiro Kuhara, Toyota (JP); Yoshinori Nishio, Toyota (JP); Takeshi Kotani, Kosai (JP); Satoshi Yoneyama, Kosai (JP)

(73) Assignees: Toyota Jidosha Kabushiki Kaisha, Toyota-shi, Aichi-ken (JP); Primearth EV Energy Co., Ltd., Shizuoka (JP)

( * ) Notice: Subject to any disclaimer, the term of this patent is extended or adjusted under 35 U.S.C. 154(b) by 293 days.

(21) Appl. No.: 13/217,570

(22) Filed: Aug. 25, 2011

(65) Prior Publication Data

US 2012/0052380 A1 Mar. 1, 2012

(30) Foreign Application Priority Data

Aug. 31, 2010 (JP) .................................. 2010-194331

(51) Int. Cl.
  *H01M 4/13* (2010.01)
  *H01M 4/64* (2006.01)
(52) U.S. Cl.
  USPC ........................... 429/211; 429/209; 29/623.1
(58) Field of Classification Search
  USPC ........... 429/161, 235, 237; 29/623.4; 428/613
  See application file for complete search history.

(56) References Cited

U.S. PATENT DOCUMENTS

| 5,415,954 A * | 5/1995 | Gauthier et al. ........... 429/161 X |
| 6,284,408 B1 * | 9/2001 | Akazawa et al. .......... 429/237 X |
| 6,995,333 B2 * | 2/2006 | Nakanishi et al. ........ 29/623.4 X |
| 7,273,678 B2 * | 9/2007 | Akita et al. ................ 429/161 X |
| 7,867,644 B2 * | 1/2011 | Aota et al. ................ 29/623.4 X |
| 2004/0096738 A1 * | 5/2004 | Fukuda et al. ............ 429/161 X |

FOREIGN PATENT DOCUMENTS

| JP | 2006-351376 | 12/2006 |
| JP | 2006351376 A * | 12/2006 |

* cited by examiner

*Primary Examiner* — Barbara Gilliam
*Assistant Examiner* — Adam A Arciero
(74) *Attorney, Agent, or Firm* — Finnegan, Henderson, Farabow, Garrett & Dunner, LLP (57) ABSTRACT

Provided is a method of manufacturing a battery having an electrode module including: a positive plate having a cathode collector portion formed by attaching a lead member to a cathode substrate made of a foamed metal plate; and a cathode collector plate welded to the cathode collector portion. The method includes: a pre-welding positive plate forming process of forming a pre-welding positive plate, which is the positive plate before welding, such that the pre-welding positive plate has a projection projecting from a pre-welding cathode collector portion, which is the cathode collector portion before welding; and a welding process of melting a pre-welding cathode collector plate to weld it to the projection. In the pre-welding positive plate forming process, the projection is formed into such a shape that the condition that $S \leq 1.3W$ is satisfied, where W and S represent the width and the circumferential length of the projection, respectively.

9 Claims, 12 Drawing Sheets

BATTERY MANUFACTURING METHOD, BATTERY, PRE-WELDING POSITIVE PLATE MANUFACTURING METHOD, AND PRE-WELDING POSITIVE PLATE

INCORPORATION BY REFERENCE

The disclosure of Japanese Patent Application No. 2010-194331 filed on Aug. 31, 2010 including the specification, drawings and abstract is incorporated herein by reference in its entirety.

BACKGROUND OF THE INVENTION

1. Field of the Invention

The invention relates to a battery manufacturing method, a battery, a pre-welding positive plate manufacturing method, and a pre-welding positive plate.

2. Description of Related Art

In related art, various secondary batteries, such as nickel-hydrogen secondary batteries, have been used as drive power sources for vehicles such as hybrid vehicles and electric vehicles and drive power sources for portable electronic devices such as laptop computers and video camcorders.

As one of such secondary batteries, for example, Japanese Patent Application Publication No. 2006-351376 (JP 2006-351376 A) describes a stack-type secondary battery, more specifically, a secondary battery having a battery case, and an electrode module that is disposed in the battery case and that is constructed of positive plates and negative plates alternately stacked on top of each other via separators. In this secondary battery, a lead portion (cathode collector portion) of each positive plate is welded to a cathode collector plate and a lead portion (anode collector portion) of each negative plate is welded to an anode collector plate.

Further, JP 2006-351376 A describes forming each positive plate by impregnating a foamed metal plate with an active material, and forming a lead portion (cathode collector portion) of the positive plate by compressing a portion of the foamed metal plate, which has not been impregnated with the active material, and then welding a nickel lead plate on one side of the compressed portion. Further, JP 2006-351376 A describes that, in order to connect the negative plates to the anode collector plate, triangular projections are formed at an end of each negative plate, the negative plate is arranged such that the projections are fitted in grooves formed in the anode collector plate, and the projections of the negative plate are joined to the grooves of the anode collector plate by delivering an electron beam from the outer side of the anode collector plate (see FIG. 4 of JP 2006-351376 A). Further, JP 2006-351376 A describes connecting each positive plate to the cathode collector plate in the same manner as described above, that is, forming triangular projections at an end of the lead portion (cathode collector portion) of the positive plate, arranging the positive plate such that the projections are fitted in grooves formed in the cathode collector plate, and then joining the projections of the positive plate to the grooves of the cathode collector plate by delivering an electron beam from the outer side of the cathode collector plate.

In the battery described in JP 2006-351376 A, as mentioned above, the lead portion (cathode collector portion) of each positive plate is formed by compressing a portion of the foamed metal plate (foamed nickel plate), which has not been impregnated with the active material, and then welding the lead plate (metal lead plate), which is made of nickel, etc., to one side of the compressed portion. Further, the negative and positive plates of the battery described in JP 2006-351376 A are manufactured by pressing. Therefore, when manufacturing each positive plate of this battery, a base board is prepared by impregnating the foamed metal plate with the active material, compressing a portion of the foamed metal plate, which has not been impregnated with the active material, and welding a nickel lead plate on one side of the compressed portion, and then the prepared base board is pressed (punch-pressed) into the shape of the positive plate.

SUMMARY OF THE INVENTION

Figure 13:
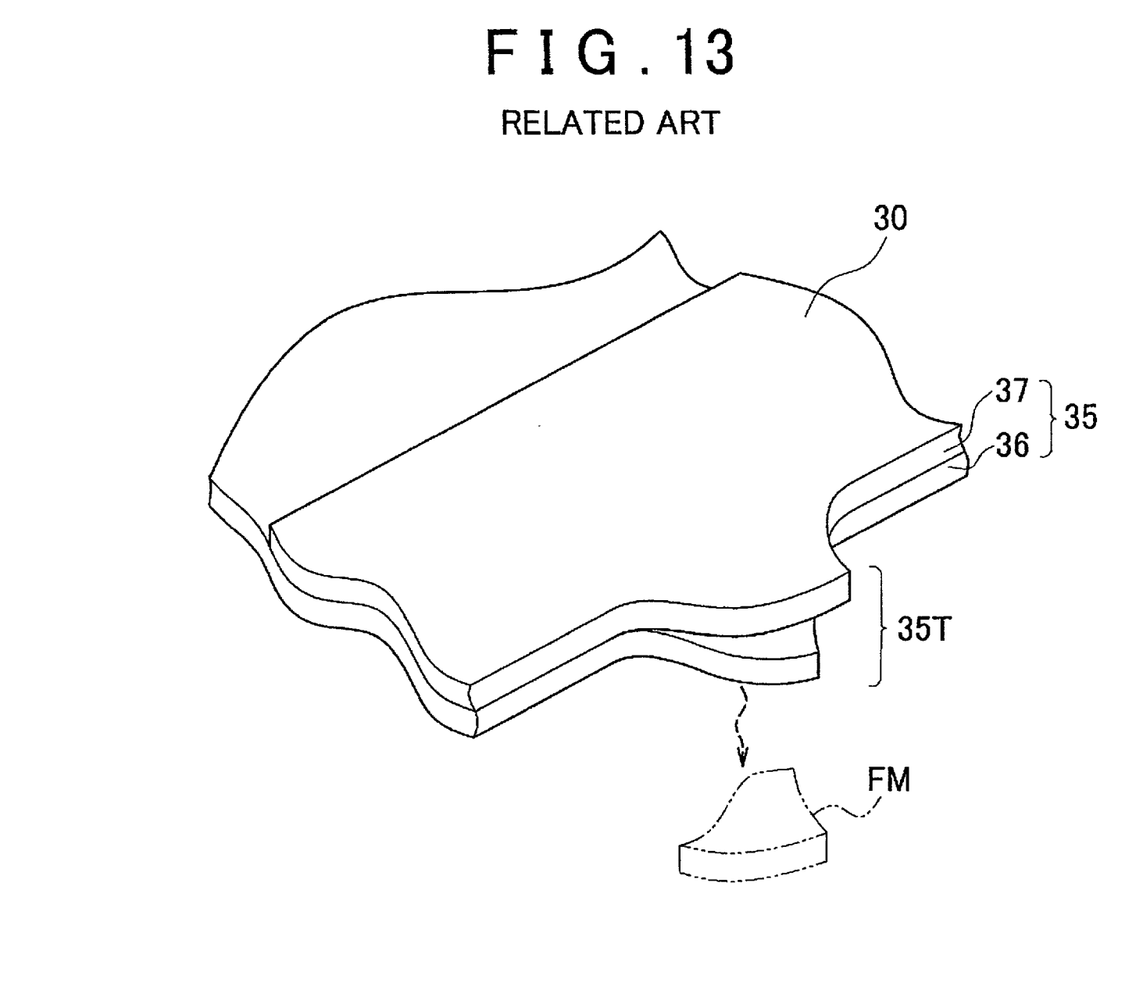
FIG. 13 is a partially enlarged perspective view of a pre-welding positive plate in related art.

However, as shown in FIG. 13, in a case where a positive plate 30 is formed by pressing, at a triangular projection 35T of a lead portion 35 that is formed by compressing a portion of a foamed metal plate (foamed nickel plate) 36, which has not been impregnated with an active material, and then welding a lead plate 37 on the compressed portion, the compressed portion of the foamed metal plate 36 may be detached from the lead plate 37, despite the fact that the lead plate 37 has been welded to the compressed portion. In such a case, because the compressed portion of the foamed metal plate 36 is brittle, a part of the compressed portion, which forms the projection 35T, may fall off and become foreign matter FM that may possibly cause a short circuit between the positive plate and the negative plate.

The invention provides a method of manufacturing a battery including a positive plate that has a cathode collector portion formed by attaching a lead member to a cathode substrate made of a foamed metal plate, and the battery. Further, the invention provides a method of manufacturing a pre-welding positive plate used for the battery, and the pre-welding positive plate.

A first aspect of the invention relates to a method of manufacturing a battery having an electrode module that includes: a positive plate including a cathode collector portion formed by attaching a lead member to a cathode substrate made of a foamed metal plate; and a cathode collector plate welded to the cathode collector portion of the positive plate. The method comprises: forming a pre-welding positive plate, which is the positive plate before welding, such that the pre-welding positive plate has a projection projecting from a pre-welding cathode collector portion, which is the cathode collector portion before welding; and melting a pre-welding cathode collector plate, which is to be made the cathode collector plate by welding, so as to weld the pre-welding cathode collector plate to the projection. A circumferential length of the projection is equal to or shorter than 1.3 times a width of the projection.

In the structure described above, the projection of the pre-welding positive plate is shaped such that the circumferential length of the projection is equal to or shorter than 1.3 times the width of the projection. Therefore, in the pre-welding positive plate, it is possible to prevent the problem that the cathode substrate is detached from the lead member at the projection and consequently part of the detached cathode substrate falls off and then becomes foreign matter. According to the manufacturing method described above, the battery having high reliability is manufactured. In addition, because the pre-welding positive plate has the projection at the pre-welding cathode collector portion, it is possible to manufacture the battery in which the positive plate and the cathode collector plate are reliably welded together.

A second aspect of the invention relates to a battery having an electrode module that includes: a positive plate having a cathode collector portion formed by attaching a lead member to a cathode substrate made of a foamed metal plate; and a cathode collector plate welded to the cathode collector portion of the positive plate. In this battery, a pre-welding positive plate, which is the positive plate before welding, has a projection that projects from a pre-welding cathode collector portion, which is the cathode collector portion before welding, the circumferential length of the projection is equal to or shorter than 1.3 times the width of the projection, and the projection and a pre-welding cathode collector plate, which is the cathode collector plate before welding, are welded to each other.

With the structure described above, because the projection is formed at the pre-welding cathode collector portion of the pre-welding positive plate, the pre-welding positive plate and the pre-welding cathode collector plate are reliably welded to each other in the battery. Further, because the projection is shaped such that the circumferential length of the projection is equal to or shorter than 1.3 times the width of the projection, the cathode substrate is not detached from the lead member at the projection, and thus the cathode substrate is prevented from partially falling off and becoming foreign matter. Thus, the battery having high reliability is obtained.

A third aspect of the invention relates to a method of manufacturing a pre-welding positive plate having a pre-welding cathode collector portion formed by attaching a lead member to a cathode substrate made of a foamed metal plate. This manufacturing method includes forming the pre-welding positive plate such that the pre-welding positive plate has a projection projecting from a pre-welding cathode collector portion, and the circumferential length of the projection of the pre-welding positive plate is equal to or shorter than 1.3 times the width of the projection.

With this structure, because the pre-welding positive plate having the projection is formed and the projection is shaped such that the circumferential length of the projection is equal to or shorter than 1.3 times the width of the projection, it is possible to prevent the problem that the cathode substrate is detached from the lead member at the projection and consequently part of the detached cathode substrate falls off and then becomes foreign matter. In addition, because the pre-welding positive plate has the projection at the pre-welding cathode collector portion, the pre-welding positive plate is reliably welded to the pre-welding cathode collector plate.

A fourth aspect of the invention relates to a pre-welding positive plate having a pre-welding cathode collector portion formed by attaching a lead member to a cathode substrate made of a foamed metal plate. In this pre-welding positive plate, a projection is formed at the pre-welding cathode collector portion, and the circumferential length of the projection is equal to or shorter than 1.3 times the width of the projection.

In this structure, the projection is formed at the pre-welding cathode collector portion, and the projection is shaped such that the circumferential length of the projection is equal to or shorter than 1.3 times the width of the projection. Therefore, the cathode substrate is unlikely to be detached from the lead member at the projection, and therefore the cathode substrate is prevented from partially falling off and becoming foreign matter. In addition, because the pre-welding positive plate has the projection at the pre-welding cathode collector portion, the pre-welding positive plate is reliably welded to the pre-welding cathode collector plate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First, the structure of a secondary battery 100 according to an example embodiment of the invention will be described with reference to the drawings. As shown in FIGS. 1 to 4, the secondary battery 100 according to the example embodiment is a nickel-hydrogen storage battery pack that includes a cuboidal battery case 110 having a case body 111, a lid 118, and liquid inlet lids 119, and a plurality of electrode modules 120 (see FIG. 4) disposed in the battery case 110 (note that six electrode modules 120 are provided in the example embodiment).

Figure 1:
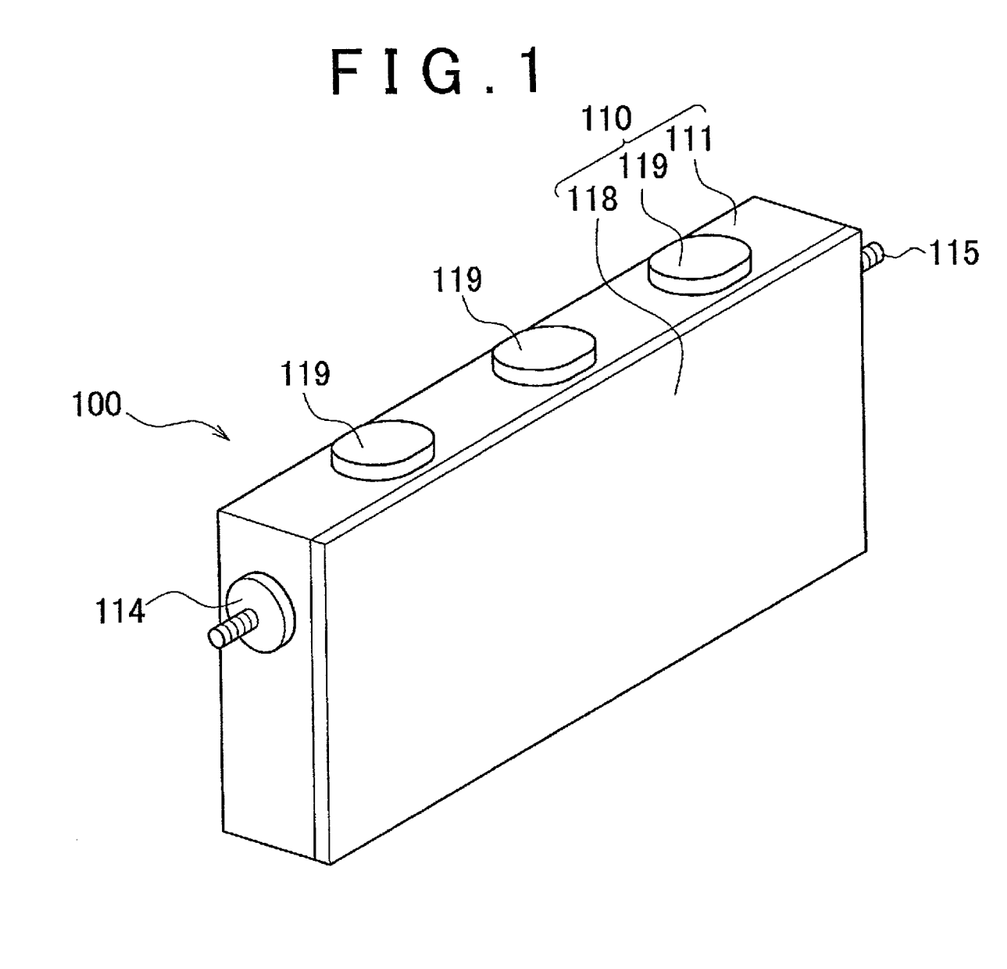
FIG. 1 is a perspective view of a secondary battery.
Figure 2:
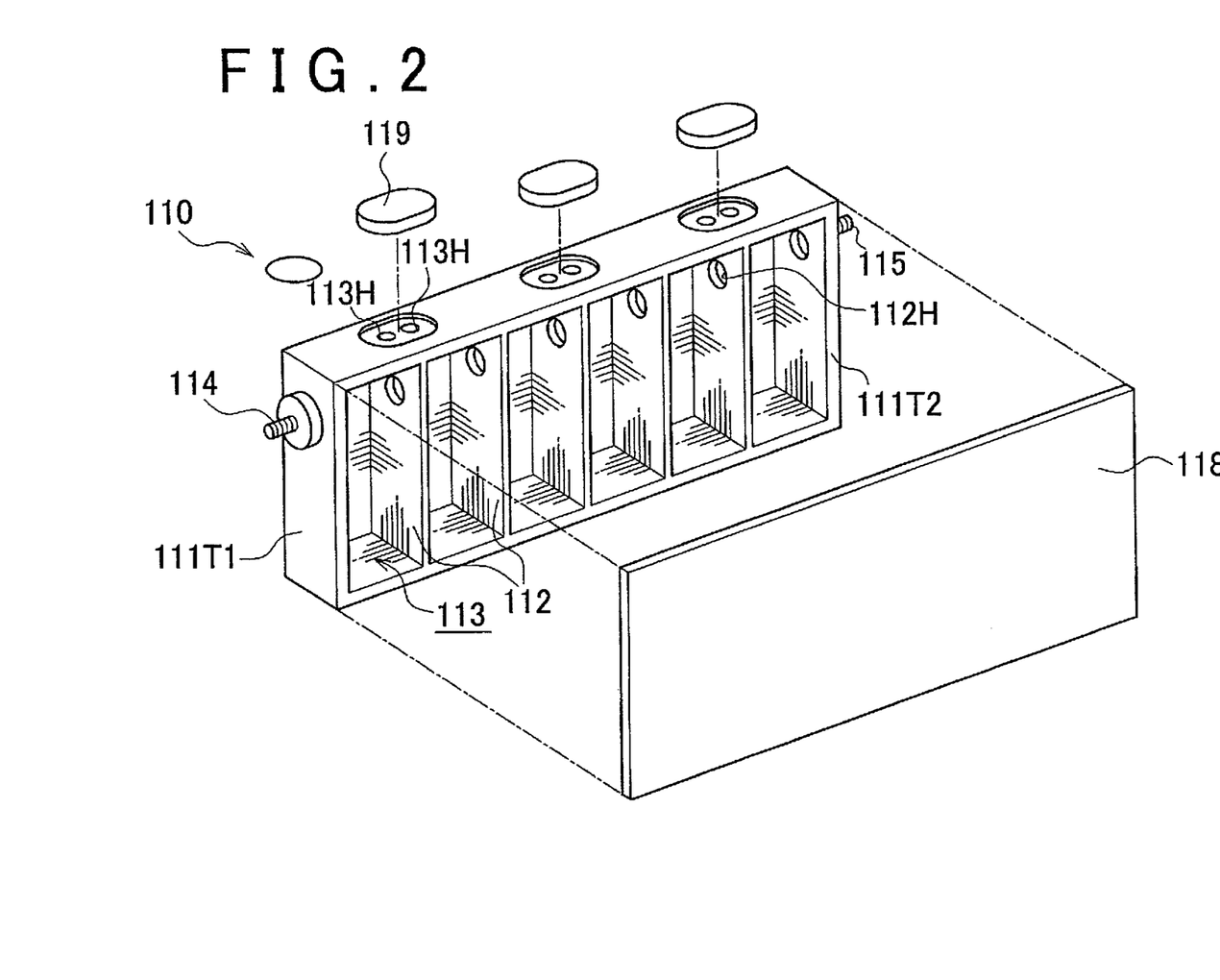
FIG. 2 is an exploded perspective view of a battery case.

As shown in FIG. 2, the external shape of the case body 111 of the battery case 110 is cuboidal. The case body 111 is a hollow member that is open at the lower-right side in FIG. 2. The case body 111 has five partitions 112 defining six separate housing portions 113 in the case body 111. A communication hole 112H is formed at the upper side of each partition 112, in FIG. 2, and the housing portions 113 next to each other communicate with each other through the communication holes 112H. As will be described later, the electrode modules 120 disposed in the housing portions 113 are connected in series via the communication holes 112H. Liquid inlets 113H communicating with the corresponding housing portions 113 are formed at a top wall 111U of the case body 111 such that paired two liquid inlets 113H for the housing portions 113 next to each other are formed so as to be close to each other. As will be described later, after pouring an electrolyte (not shown in the drawings), each pair of the liquid inlets 113H is sealed by the liquid inlet lid 119 fixed on the top wall 111U. A collective positive terminal 114 is provided at an end wall 111T1 at one side of the case body 111 (the lower-left side, in FIG. 2), while a collective negative terminal 115 is provided at an end wall 111T2 at the other side of the case body 111 (the upper-right side, in FIG. 2). The lid 118 seals the case body 111 by being fixed on the case body 111 after the electrode modules 120 are housed in the housing portions 113 of the case body 111 and then connected to each other. It is to be noted that the case body 111 is a single-piece part formed by resin-injection molding.

Figure 4:
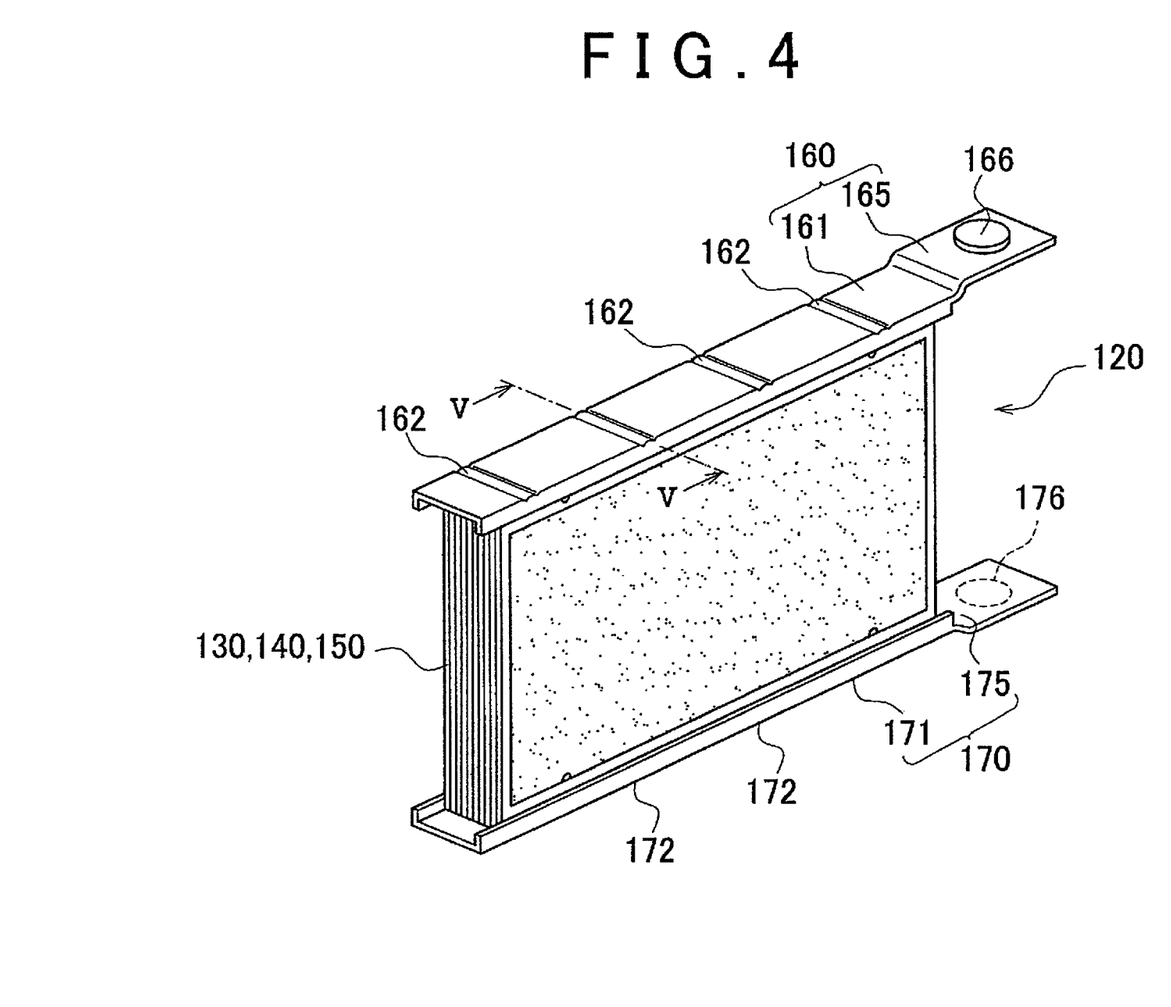
FIG. 4 is a perspective view of an electrode module.
Figure 5:
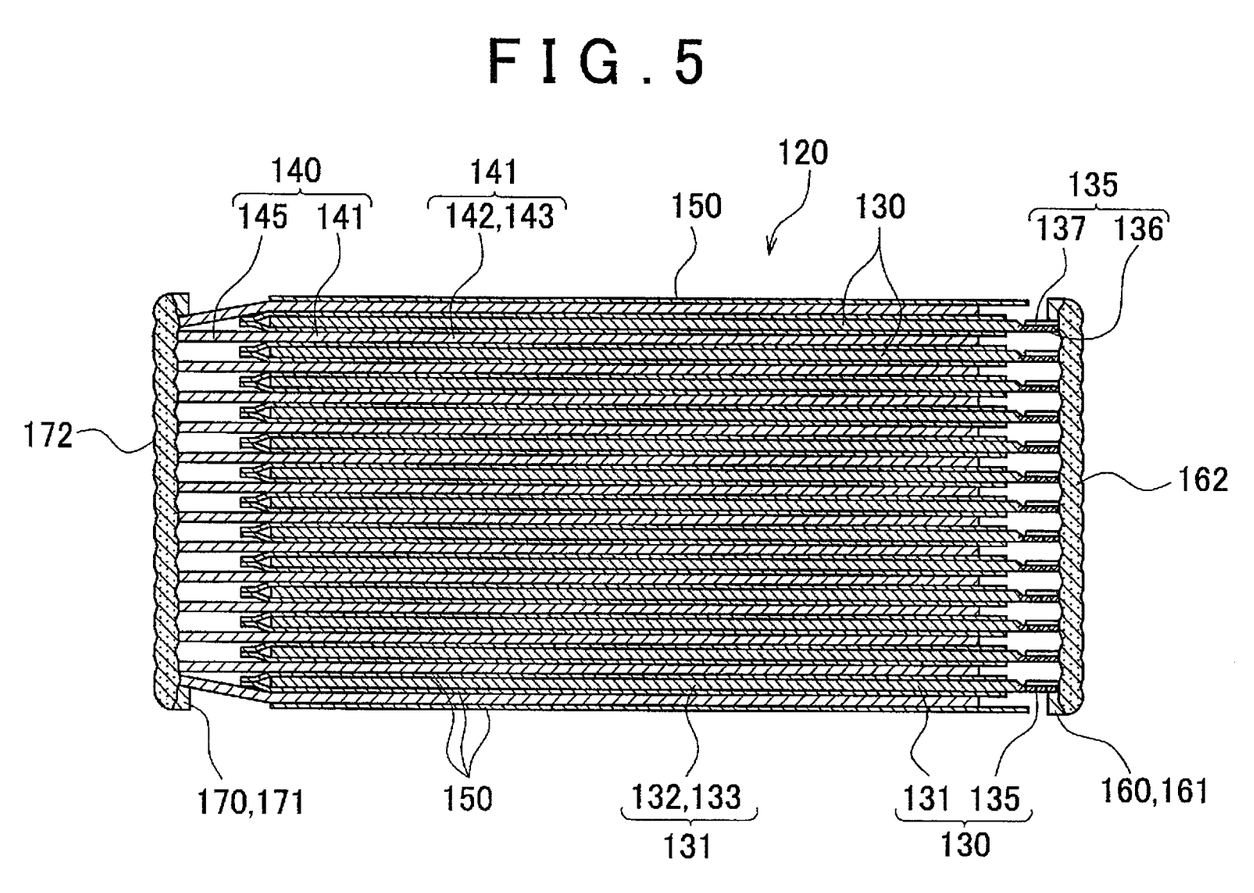
FIG. 5 is a sectional view of the electrode module, taken along the line V-V in FIG. 4.

The electrode modules 120, structured as shown in FIG. 4, are disposed in the respective housing portions 113 of the case body 111 and impregnated with the electrolyte (not shown in the drawings). As shown in FIGS. 4 and 5, each electrode module 120 has positive plates 130, negative plates 140, and bag-like separators 150. The positive plates 130 are placed in the bag-like separators 150. The electrode modules 120 are each provided as a stack-type electrode module in which the positive plates 130, placed in the separators 150, and the negative plates 140 are alternately stacked on top of each other. It is to be noted that each positive plate 130 is welded, at a cathode collector portion 135 located at one end (the upper end in FIG. 4, the right end in FIG. 5) of the positive plate 130, to a cathode collector plate 160. Likewise, each negative plate 140 is welded, at an anode collector portion 145 located at one end (the lower end in FIG. 4, the left end in FIG. 5) of the negative plate 140, to an anode collector plate 170.

Figure 6A:
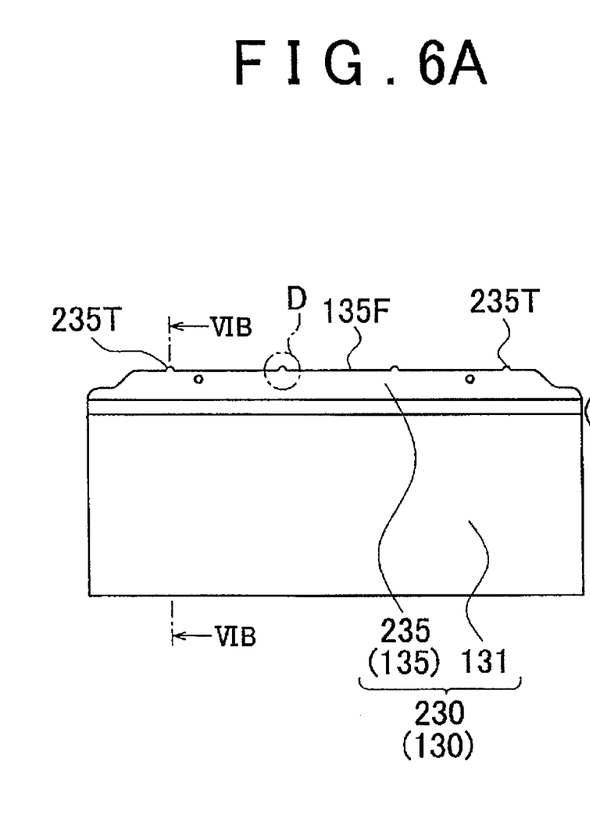
FIG. 6A is a plain view of a pre-welding positive plate.
Figure 6B:
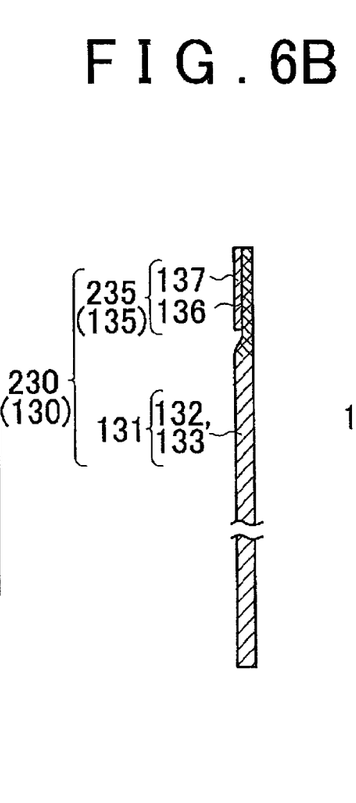
FIG. 6B is a sectional view of the pre-welding positive plate shown in FIG. 6A, taken along the line VIB-VIB.
Figure 6C:
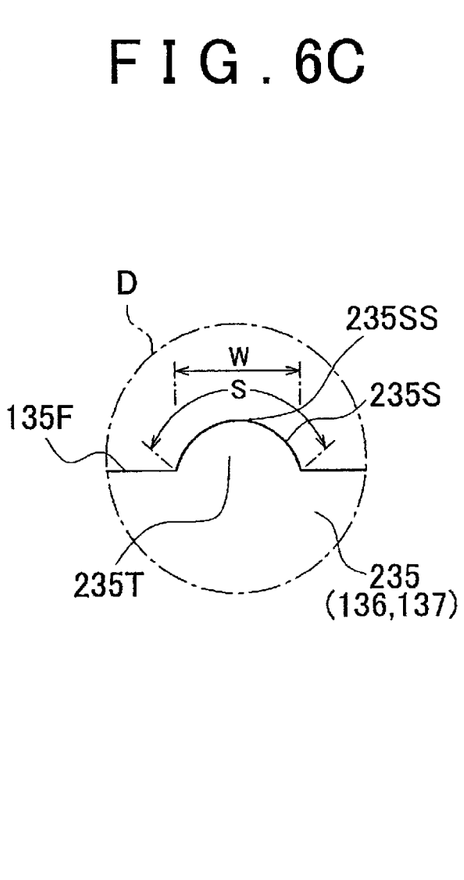
FIG. 6C is an enlarged view of a portion D of the pre-welding positive plate shown in FIG. 6A.

As shown in FIG. 6, a pre-welding positive plate 230 that is the positive plate 130 before being welded to the cathode collector plate 160 is constructed of a cathode portion 131 that is rectangular and occupies most of the pre-welding positive plate 230, and a pre-welding cathode collector portion 235 (the cathode collector portion 135) that is located at one end of the cathode portion 131. The cathode portion 131 is formed by causing a cathode active material 133 containing nickel hydroxide to be supported on a cathode substrate 132 that is made of a foamed metal plate (a foamed nickel plate in the example embodiment). On the other hand, the pre-welding cathode collector portion 235 (the cathode collector portion 135) is formed by attaching, through ultrasonic welding, a metal lead plate 137 (a steel plate in the example embodiment) to a compressed cathode substrate 136 formed by compressing the foamed metal plate, at a portion on which the cathode active material is not supported, in the thickness direction. As will be described later, each Pre-welding positive plate 230 (each positive plate 130) is formed by punch-pressing a cathode base board 200.

The pre-welding cathode collector portion 235 of each pre-welding positive plate 230 has four projections 235T each projecting in a domical shape (shape of a part of a disc, of which the outer periphery is in an arc shape) from an edge 135F of the pre-welding cathode collector portion 235. The four projections 235T are arranged at the edge 135F at regular intervals. Further, as shown in FIG. 6C that is an enlarged view of the projection 235T, each projection 235T is formed such that the condition that $S \leq 1.3W$ is satisfied, where W represents the width of each projection 235T and S represents the circumferential length of the arc shape of each projection 235T.

The structure of the negative plates 140 is almost the same as that of the positive plates 130. That is, each negative plate 140 has a rectangular anode portion 141 that occupies most of the negative plate 140 and an anode collector portion 145 located at one end of the anode portion 141. The anode portion 141 is formed by coating a porous metal plate 142 (a nickel punch metal in the example embodiment) with hydrogen-storing alloy powder 143. A portion of the porous metal plate 142, which is not coated with the hydrogen-storing alloy powder 143, is used as the anode collector portion 145. The negative plates 140 (the pre-welding negative plates 240) are each formed by punch-pressing an anode base board prepared by coating given portions of the porous metal plate 142 with the hydrogen-storing alloy powder 143.

Each separator 150 is formed of non-woven fabric made of hydrophilized synthetic fibers, such as polyolefin resin or polyamide resin. The electrolyte is, for example, an alkaline aqueous solution containing KOH and having a specific gravity of 1.2 to 1.4.

Figure 7:
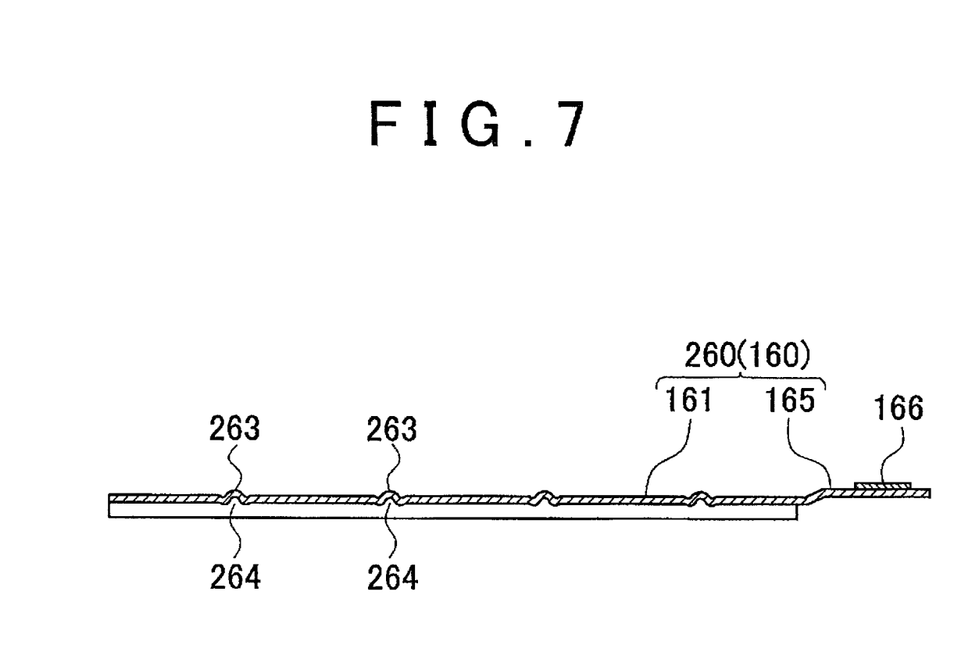
FIG. 7 is a sectional view of a pre-welding cathode collector plate.

As shown in FIG. 7, a pre-welding cathode collector plate 260 (the cathode collector plate 160) is an elongated plate prepared by pressing a nickel-plated steel plate. The pre-welding cathode collector plate 260 is formed in a generally U-shape in cross section. The pre-welding cathode collector plate 260 has a positive plate retainer portion 161 welded to and thus retaining each positive plate 130 and a connection tab 165 extending from the positive plate retainer portion 161 and connected, in the battery case 110 (the case body 111), to the anode collector plate 170 of the adjacent electrode module 120.

The positive plate retainer portion 161 has four generally W-shaped bent deformation portions 263 that are formed by bending the metal plate at four positions corresponding to the positions of the projections 235T of the pre-welding positive plate 230, and recesses 264 formed due to formation of the bent deformation portions 263. Thus, as shown in the enlarged view of FIG. 8A, the pre-welding cathode collector plate 260 and each pre-welding positive plate 230 are arranged such that the projections 235T of the pre-welding positive plate 230 are partially fitted in the recesses 264, and then laser welding is performed as described later. When welded, the bent deformation portions 263 of the pre-welding cathode collector plate 260 and the projections 235T of each pre-welding positive plate 230 are melted together, whereby weld portions 162 (not shown in FIG. 8B) are formed between the positive plate retainer portion 161 of the cathode collector plate 160 and projections 135T of the positive plate 130, as shown in the enlarged view of FIG. 8B. As a result, the cathode collector plate 160 and the cathode collector portion 135 of each positive plate 130 are mechanically and electrically connected to each other. It is to be noted that, although not described in detail, the structure of the pre-welding anode collector plate 240 (the anode collector plate 170 with a negative plate retainer portion 171) is substantially the same as the above-described structure of the pre-welding cathode collector plate 260 (the cathode collector plate 160), and the anode collector plate 170 and the anode collector portion 145 of each negative plate 140 are welded to each other (forming weld portions 172) in substantially the same manner as described above.

Figure 3:
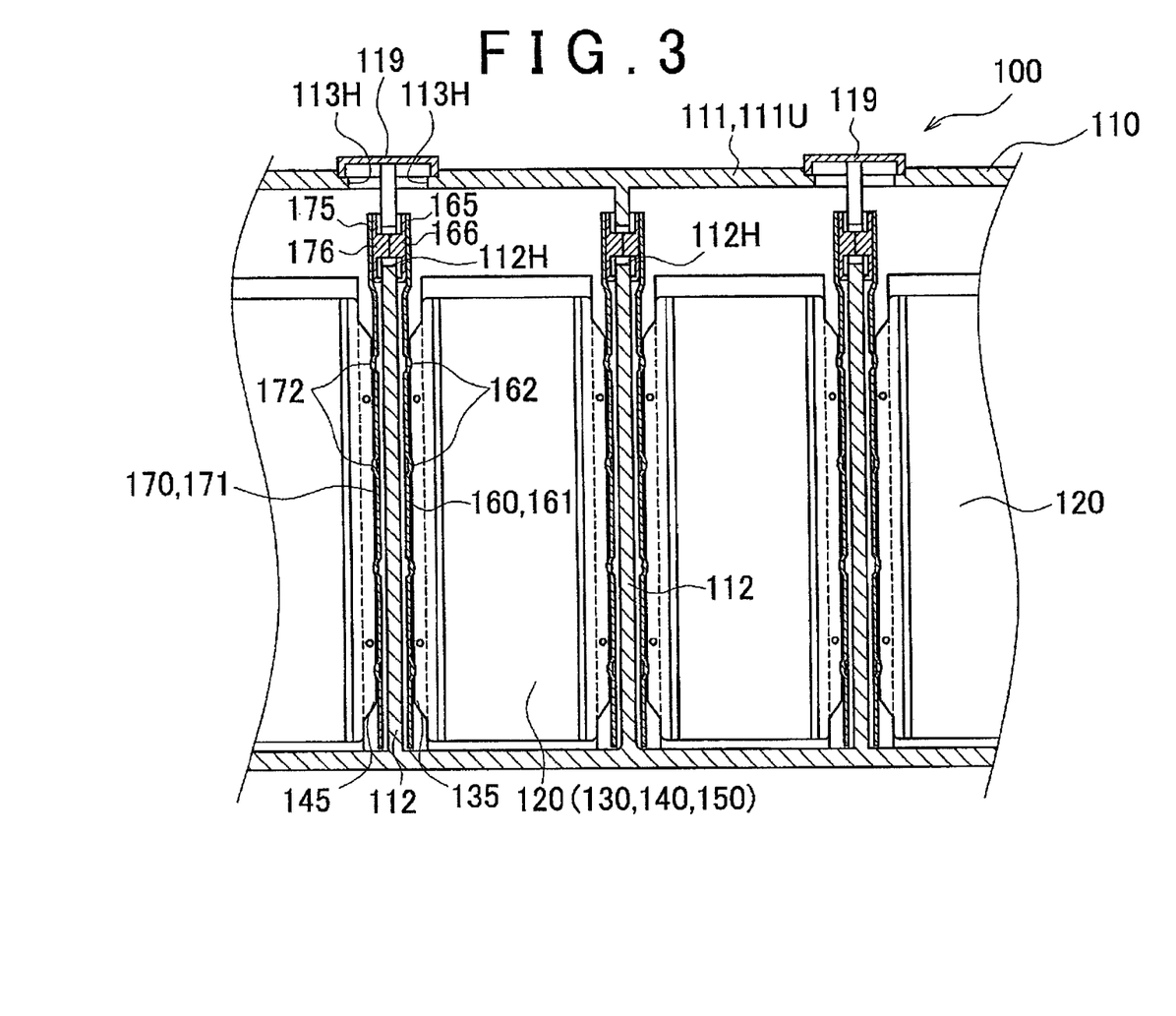
FIG. 3 is a partially cutaway sectional view of the secondary battery.

A connection terminal 166 is provided at the connection tab 165 of the pre-welding cathode collector plate 260 (the cathode collector plate 160), and the connection terminal 166 is connected to a connection tab 175 of the anode collector plate 170 of the adjacent electrode module 120. In this regard, the anode collector plate 170 has the same structure as described above. That is, a connection terminal 176 is provided at the connection tab 175 of the anode collector plate 170, and the connection terminal 176 is connected to the connection tab 165 of the cathode collector plate 160 of the adjacent electrode module 120 in the battery case 110 (see FIG. 3). In the secondary battery 100 according to the example embodiment, as shown in FIG. 3, the connection terminal 166 of the cathode collector plate 160 of each electrode module 120 and the connection terminal 176 of the anode collector plate 170 of the adjacent electrode module 120 are inserted into the same communication hole 112H formed in the corresponding partition 112 of the case body 111 and are connected to each other by resistance welding.

In the secondary battery 100 described above, because the pre-welding cathode collector portion 235 of each pre-welding positive plate 230 has the projections 235T, the cathode collector portion 135 of each positive plate 130 and the cathode collector plate 160 (i.e., the pre-welding cathode collector portion 235 of each pre-welding positive plate 230 and the pre-welding cathode collector plate 260) are reliably welded to each other. Further, because each projection 235T is in such a shape that the condition that $S \le 1.3W$ is satisfied, the compressed cathode substrate 136 (the cathode substrate 132) is not detached from the metal lead plate 137 at each projection 235T, and thus the compressed cathode substrate 136 is prevented from partially falling off and then becoming foreign matter, as will be described later. Therefore, the secondary battery 100 having high reliability is obtained.

In the secondary battery 100 structured as described above, further, each projection 235T of the pre-welding positive plate 230 is arc-shaped at least at a tip peripheral edge 235SS, more specifically, each projection 235T of the pre-welding positive plate 230 projects in a domical shape such that its peripheral edge 235S is arc-shaped. Further, each projection 235T is in such a shape that the condition that $S \le 1.3W$ is satisfied. Therefore, it is possible to especially reliably prevent the problem that the compressed cathode substrate 136 is detached from the metal lead plate 137 at each projection 235T of the pre-welding positive plate 230 and consequently part of the detached compressed cathode substrate 136 falls off and then becomes foreign matter. As a result, the secondary battery 100 having higher reliability is obtained.

Further, in the example embodiment, each pre-welding positive plate 230 has the projections 235T at the pre-welding cathode collector portion 235, and each projection 235T is in such a shape that the condition that $S \le 1.3W$ is satisfied. Therefore, the compressed cathode substrate 136 is unlikely to be detached from the metal lead plate 137 at each projection 235T, preventing the problem that part of the detached compressed cathode substrate 136 falls off and then becomes foreign matter. Because the pre-welding cathode collector portion 235 of each pre-welding positive plate 230 has the projections 235T, the pre-welding positive plates 230 are reliably welded to the pre-welding cathode collector plate 260.

Figure 9:
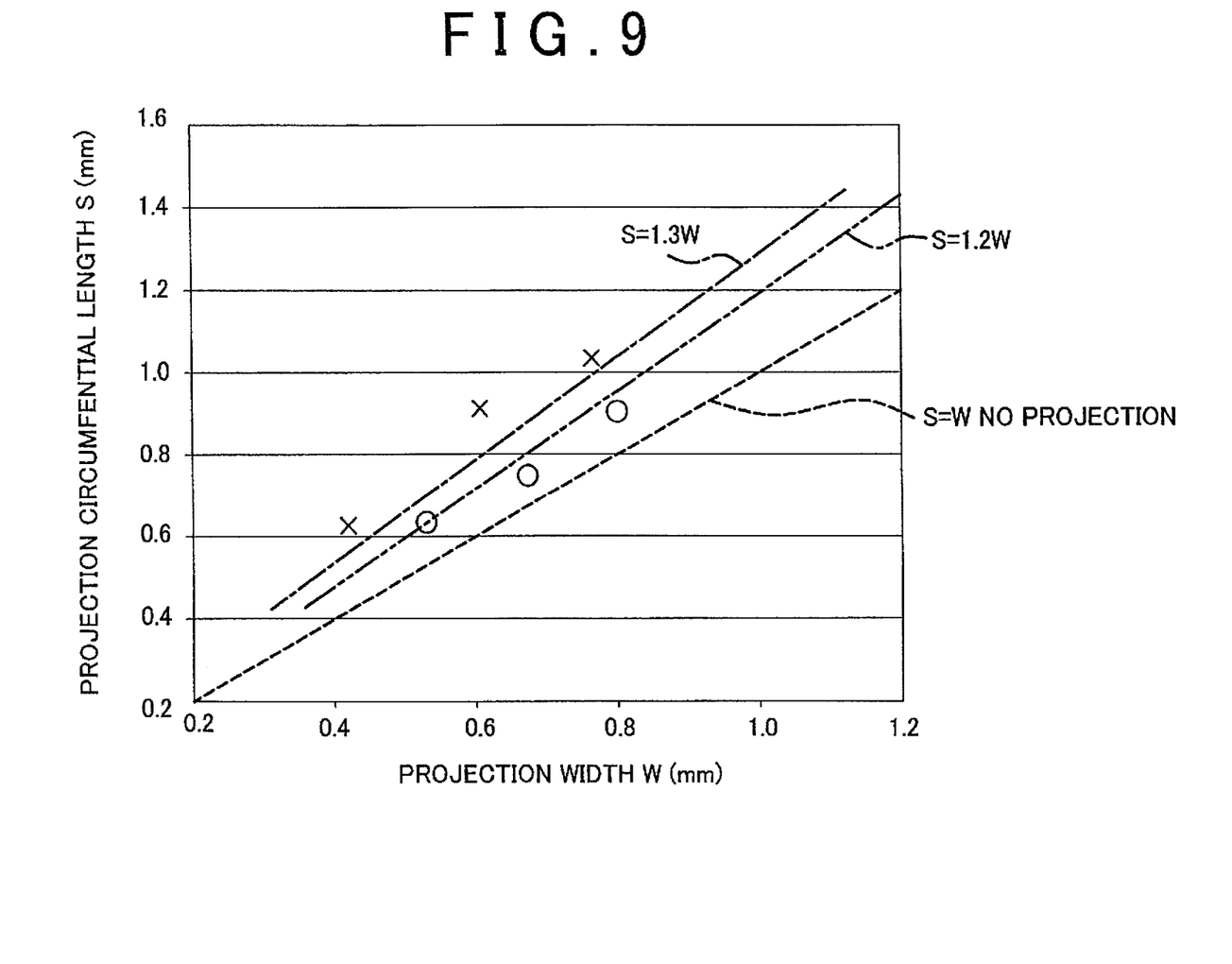
FIG. 9 is a graph illustrating the results of tests that were conducted on multiple pre-welding positive plates that are different in width W of a projection and circumferential length S of an arc shape of the projection, to examine whether detachment occurs at each projection.

Next, a description will be made on the results of a test for evaluation on the shape of the projections 235T of the pre-welding cathode collector portion 235 of each pre-welding positive plate 230 in the secondary battery 100. As test samples, multiple pre-welding positive plates that are different in width W of each projection 235T and circumferential length S of the arc shape of each projection 235T were prepared by punch-pressing as described later. Then, whether detachment occurred between the compressed cathode substrate 136 and the metal lead plate 137 at the projection 235T was examined in each test sample. The graph in FIG. 9 shows the test results.

In the graph, the broken line extending from the lower-left side to the upper-right side represents the case where no projection is formed (i.e., S=W), the circles each represent the test sample in which the compressed cathode substrate 136 was not detached from the metal lead plate 137, and the crosses each represent the test sample in which the compressed cathode substrate 136 was detached from the metal lead plate 137. As is understood from the graph, in the region on the upper side of the broken line (the region showing the cases where the projections are formed), when the characteristic of a test sample is close to the broken line (S=W), detachment does not occur (see the circles), whereas when the characteristic of a test sample is distant from the broken line, that is, when the amount of projection of the test sample is large and the circumferential length S is large with respect to the width W, detachment occurs (see the crosses). Further, it is found that in the region between the single-dot chain line extending from the lower-left side to the upper-right side and the broken line, that is, the region where S is equal to or less than 1.3W ($S \le 1.3W$), detachment is unlikely to occur at each projection. In addition, it is found that in the region between the double-dot chain line extending from the lower-left side to the upper-right side and the broken line, that is, the region where S is equal to or less than 1.2W ($S \le 1.2W$), detachment is more unlikely to occur at each projection. While the projections 235T are formed by punch-pressing in the example embodiment, the projections 235T may be formed in various other manners. Further, while the projections 235T are in domical shape in the example embodiment, the projections 235T may be formed into various other shapes as long as at least the tip peripheral edge 235SS of each projection have an arc shape.

Figure 12:
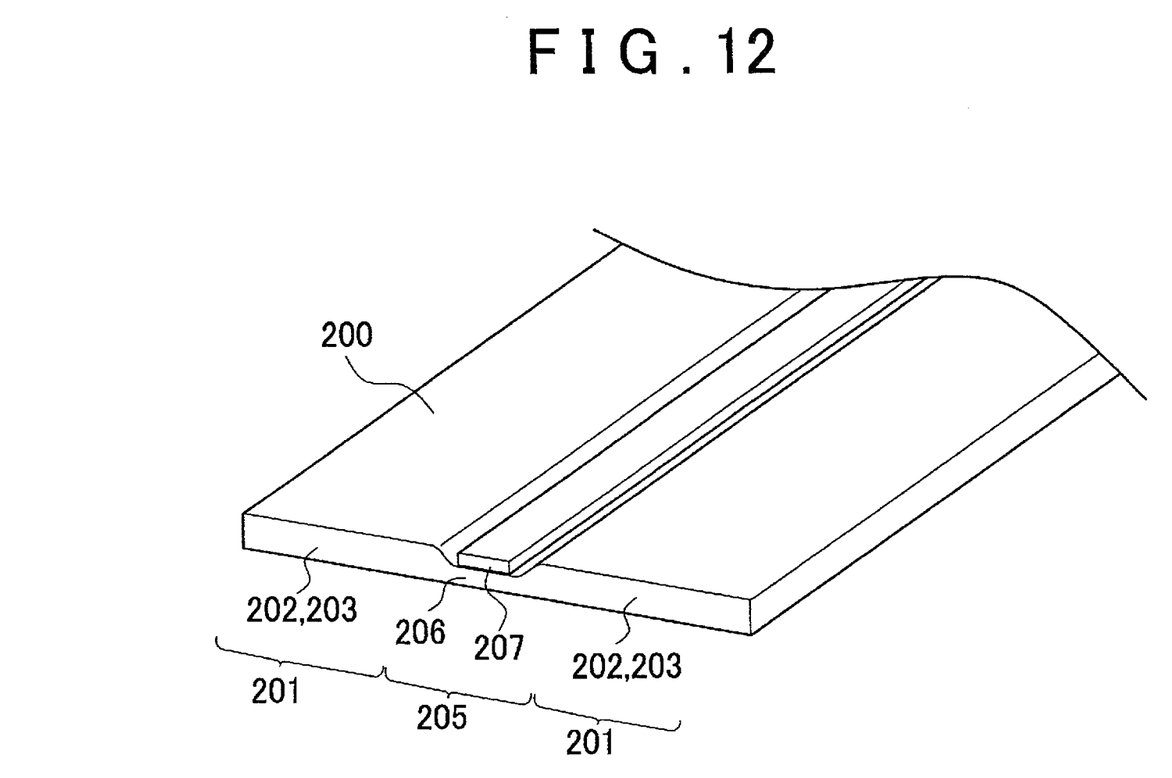
FIG. 12 is a perspective view of a cathode base board.

Next, the method of manufacturing the secondary battery 100 according to the example embodiment will be described. First, the cathode base board 200 shown in FIG. 12 is prepared. The cathode base board 200 has two support portions 201 and an attachment portion 205 formed between the support portions 201. The support portions 201 are each in an elongated shape and formed by causing a cathode active material 203 to be supported on a foamed metal plate (foamed nickel plate) 202. The attachment portion 205 is formed by fixing, by ultrasonic welding, an elongated metal plate 207, which is an elongated steel plate, on one side (the upper side in FIG. 12) of a compressed foamed metal portion 206 that is formed by compressing the foamed metal plate 202, in its thickness direction, at a portion between the two support portions 201 with no cathode active material 203 supported on the portion. The support portions 201 of the cathode base board 200 are formed by applying a paste of the cathode active material 203 on the elongated foamed metal plate 202 except its lateral center portion. The lateral center portion of the foamed metal plate 202 is compressed by roll pressing to be formed into the compressed foamed metal portion 206. Then, the elongated steel plate is welded on one side of the compressed foamed metal portion 206 by ultrasonic welding, whereby the attachment portion 205 is completed.

Subsequently, a punching process is performed in which each pre-welding positive plate 230 (see FIGS. 6A to 6C) is formed by punch-pressing the cathode base board 200. More specifically, the cathode base board 200 is punched at two portions such that the formed pre-welding positive plates 230 are symmetric in the lateral direction and the pre-welding cathode collector portions 235 are located inside.

During this punch-pressing process, the projections 235T are also formed at the pre-welding cathode collector portion 235. While the projections in the related-art described above are triangular, the projections 235T in the example embodiment each project, in a domical shape, from the cathode collector portion and are in such a shape that the condition that $S \le 1.3W$ is satisfied. Therefore, as described earlier with reference to FIG. 9, although the projections 235T are formed, the compressed cathode substrate 136, at which the projections 235T are formed, is not detached from the metal lead plate 137, unlike in the related-art (see FIG. 13). That is, it is considered that, as compared to a case where triangular projections are formed as in the related art, the stress applied to each projection 235T (especially, its tip) during formation of the projection 235T by punch-pressing is small and therefore the compressed cathode substrate 136 is unlikely to be detached from the metal lead plate 137. In the secondary battery 100 produced using the pre-welding positive plates 230, the compressed cathode substrate 136 (the cathode substrate), at which the projections 235T are formed, does not chip off and become foreign matter, unlike in the related art. Thus, the reliability of the secondary battery 100 is high. It is to be noted that each pre-welding negative plate is formed by punch-pressing an anode base board in substantially the same manner as described above.

Figure 8A:
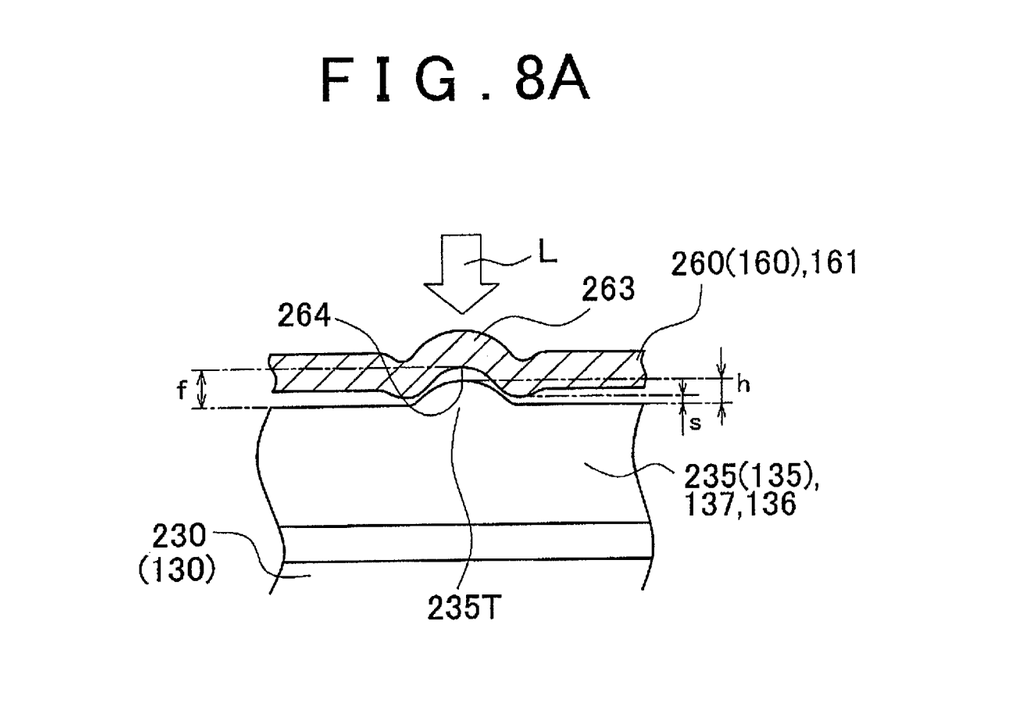
FIG. 8A is a partially enlarged sectional view illustrating the arrangement of each pre-welding positive plate and the pre-welding cathode collector plate.
Figure 8B:
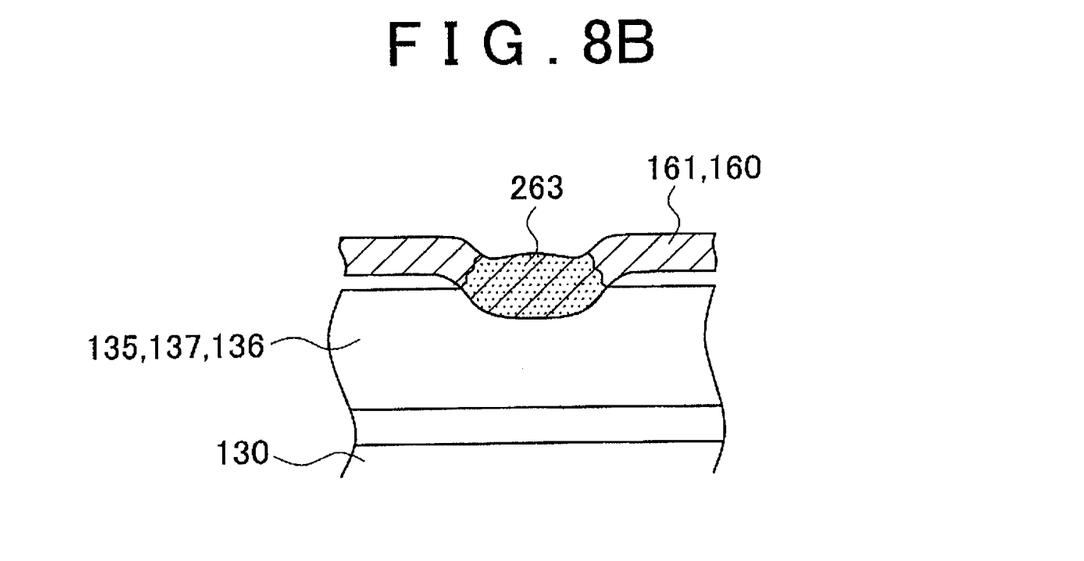
FIG. 8B is a partially enlarged sectional view illustrating connection between each positive plate and the cathode collector plate after welding.

The pre-welding positive plates 230 are inserted into the bag-like separators 150. Then, the multiple pre-welding positive plates 230, placed in the bag-like separators 150, and the multiple pre-welding negative plates are alternately stacked on top of each other, while being arranged such that each pre-welding cathode collector portion 235 and each pre-welding anode collector portion are located at the outer sides. Then, the pre-welding cathode collector plate 260 is arranged such that the positive plate retainer portion 161 of the pre-welding cathode collector plate 260 is perpendicular to the pre-welding cathode collector portion 235 of each of the stacked pre-welding positive plates 230. At this time, the pre-welding cathode collector plate 260 is positioned such that the projections 235T of the pre-welding cathode collector portion 235 of each pre-welding positive plate 230 are partly fitted into the recesses 264 of the pre-welding cathode collector plate 260, as shown in FIG. 8A. Therefore, because the recesses 264 are formed in the pre-welding cathode collector plate 260 and the projections 235T are formed in the pre-welding cathode collector portion 235 of each pre-welding positive plate 230, the pre-welding cathode collector plate 260 and each pre-welding positive plate 230 are easily aligned with each other.

Figure 10:
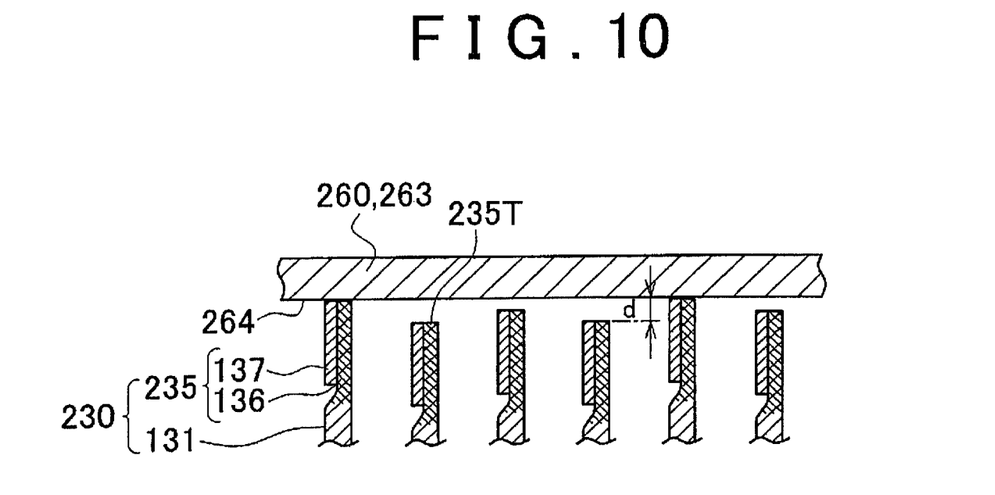
FIG. 10 is a view illustrating the arrangement of the pre-welding cathode collector plate and the pre-welding positive plates.

Meanwhile, as shown in FIG. 10, the positions (the positions in the up-down direction in FIG. 10) of the pre-welding positive plates 230 vary within the tolerance limits. Therefore, the lengths of gaps d between the projections 235T of the pre-welding positive plates 230 and the recesses 264 (the bent deformation portions 263) of the pre-welding cathode collector plate 260 vary, that is, some gaps d may be large while the others gaps d may be small. Further, when each bent deformation portion 263 of the pre-welding cathode collector plate 260 is melted by laser welding as described later, an oxide film formed on the surface of each melted portion may impede the deformation and expansion of the melted portion. According to the example embodiment, however, because the projections 235T are formed at the pre-welding cathode collector portion 235 of each pre-welding positive plate 230, the melted portion formed by melting each bent deformation portion 263 easily reaches the corresponding projection 235T, and therefore the pre-welding cathode collector plate 260 is reliably welded to the cathode collector portion 135 of each positive plate 130.

Figure 11:
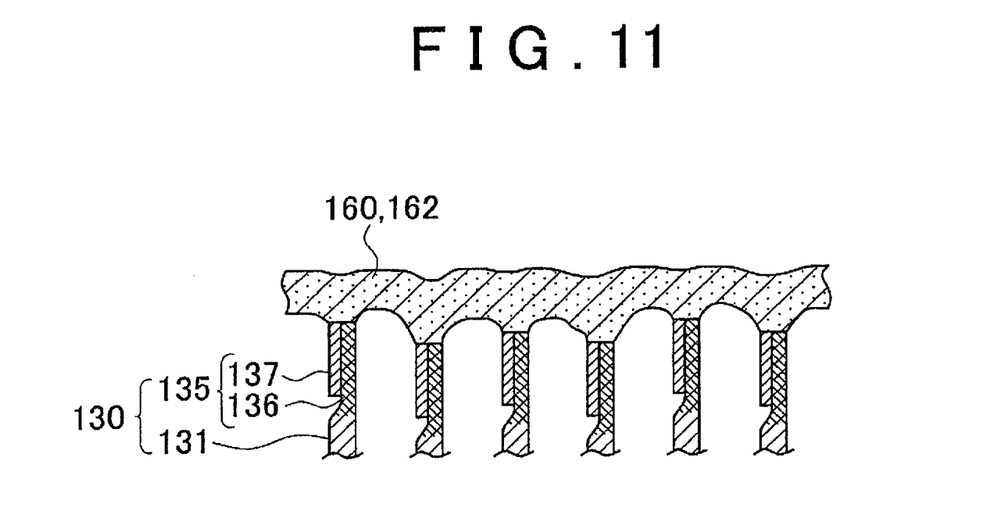
FIG. 11 is a view illustrating connection between the pre-welding cathode collector plate and the pre-welding positive plates.

In the welding process, the pre-welding cathode collector plate 260 and each pre-welding positive plate 230 are aligned with each other, and then a laser beam L is delivered, from the upper side in FIG. 8A, to each bent deformation portion 263 of the pre-welding cathode collector plate 260, as indicated by the arrow in FIG. 8A, to melt the bent deformation portion 263. It is to be noted that the pre-welding cathode collector plate 260 is welded to each positive plate 130 while moving the laser beam L in the lateral direction of the pre-welding cathode collector plate 260 (the direction perpendicular to the sheet on which FIG. 8A is drawn, the lateral direction in FIG. 10). The device for generating the laser beam L may be, for example, a YAG laser generator, a $CO_2$ laser generator, a semiconductor laser generator, or an excimer laser generator. The projections 235T at the pre-welding cathode collector portion 235 of each pre-welding positive plate 230 are melted together with and thereby integrated with the bent deformation portions 263 of the pre-welding cathode collector plate 260, and then cooled. This is how the weld portions 162, shown in FIG. 11, are formed. Because the projections 235T are formed at the pre-welding cathode collector portion 235 of each pre-welding positive plate 230 as described above, even if the gaps d shown in FIG. 10 vary in length, all the positive plates 230 are appropriately welded to the cathode collector plate 160 as shown in FIG. 11.

The cathode collector plate 160 is more reliably welded to the cathode collector portion 135 of each positive plate 130 if the condition that s≤h≤f is satisfied, where h represents the height of each projection 235T, s represents the maximum length of the gap between the pre-welding positive plate 230 (excluding the projections 235T) and the pre-welding cathode collector plate 260, the maximum length being the longest among the lengths of the gaps that vary due to the dimensional tolerances for the pre-welding positive plates 230, and f represents the depth of each recess 264 of the pre-welding cathode collector plate 260, as shown in FIG. 8A. Then, the pre-welding anode collector plate is welded to each pre-welding negative plate in the same manner as described above. This is how each electrode module 120, shown in FIGS. 4 and 5, is manufactured. It is to be noted that the compressed cathode substrate 136 is more unlikely to be detached from the metal lead plate 137 if the height h of each projection 235T of the pre-welding positive plate 230 is set to 0.1 to 0.2 mm.

Next, the electrode modules 120 are housed in the housing portions 113 of the case body 111, and then the cathode collector plate 160 of each electrode module 120 is connected to the anode collector plate 170 of the adjacent electrode module 120. More specifically, the connection terminal 166 of the connection tab 165 of the cathode collector plate 160 of each electrode module 120, which is located in the communication hole 112H of the corresponding partition 112, is connected, by resistance welding, to the connection terminal 176 of the connection tab 175 of the anode collector plate 170 of the adjacent electrode module 120, which is located in the same communication hole 112H. It is to be noted that the connection terminal 166 of the electrode module 120 located at one end of the battery pack is connected to the collective positive terminal 114 embedded in the end wall 111T1 of the case body 111, and the connection terminal 176 of the electrode module 120 located at the other end of the battery pack is connected to the collective negative terminal 115 embedded in the end wall 111T2 of the case body 111. Thus, all the electrode modules 120 are electrically connected in series, and the collective positive terminal 114 and the collective negative terminal 115 serve, respectively, as the positive terminal and negative terminal for all the six electrode modules 120 connected in series.

Then, the flat lid 118 is hermetically attached to the case body 111 by heat-plate welding. Next, the electrolyte is poured into the housing portions 113 via the liquid inlets 113H, and then the liquid inlet lids 119 are hermetically attached to the top wall 111U of the case body 111 by heat-plate welding, whereby the secondary battery 100 is completed.

According to the above method of manufacturing the secondary battery 100, the projections 235T of each pre-welding positive plate 230 are in such a shape that the condition that S≤1.3W is satisfied as mentioned above. Therefore, in the pre-welding positive plate 230, it is possible to prevent the problem that the compressed cathode substrate 136 (cathode substrate) is detached from the metal lead plate 137 at each projection 235T and consequently part of the detached compressed cathode substrate 136 falls off and then becomes foreign matter. As a result, the secondary battery 100 having higher reliability is obtained. In addition, because each pre-welding positive plate 230 has the projections 235T at the pre-welding cathode collector portion 235, the cathode collector plate 160 is reliably welded to the respective positive plates 130 in the secondary battery 100.

According to the method of manufacturing the secondary battery 100 in the example embodiment, the pre-welding cathode collector plate 260 is shaped to have the recesses 264. Therefore, the pre-welding cathode collector plate 260 and each pre-welding positive plate 230 are easily aligned with each other by just fitting the projections 235T of the pre-welding positive plate 230 into the recesses 264. Further, because each projection 235T is formed in an arc-shape at least at the tip peripheral edge 235SS, the compressed cathode substrate 136 is unlikely to be detached from the metal lead plate 137 especially at the projections 235T. Therefore, the compressed cathode substrate 136 is more reliably prevented from partially falling off and then becoming foreign matter. As a result, it is possible to manufacture the secondary battery 100 having higher reliability. According to the example embodiment, because each projection 235T is dome-shaped such that its entire peripheral edge 235S has an arc shape, the compressed cathode substrate 136 is more unlikely to be detached from the metal lead plate 137 and thus the secondary battery 100 having particularly high reliability is obtained.

According to the above method of manufacturing the secondary battery 100, the compressed cathode substrate 136 formed by compressing the cathode substrate 132, which is a foamed metal plate, is used as the substrate of the cathode collector portion 135 (the pre-welding cathode collector portion 235) of each positive plate 130 (each pre-welding positive plate 230). Thus, as compared to a case where an uncompressed foamed metal plate is used as the substrate of the cathode collector portion, the metal lead plate 137 is more reliably attached to the compressed cathode substrate 136, and the compressed cathode substrate 136 is higher in strength and thus is unlikely to partially chip off and fall off. Accordingly, the compressed cathode substrate 136 is unlikely to be detached from the metal lead plate 137 at the projections 235T, and thus the compressed cathode substrate 136 is unlikely to partially fall off and become foreign matter. Therefore, it is possible to manufacture the manufactured secondary battery 100 having higher reliability.

According to the above method of manufacturing the secondary battery 100, each pre-welding positive plate 230 having the projections 235T is formed by punch-pressing, in the punching process, the cathode base board 200 having the support portions 201 and the attachment portion 205, and each projection 235T is in such a shape that the condition that S≤1.3W is satisfied. Therefore, even if each pre-welding positive plate 230 is formed by punch-pressing in the punching process such that the projections 235T are formed, it is possible to easily prevent the problem that the compressed cathode substrate 136 is detached from the metal lead plate 137 at each projection 235T and consequently part of the detached compressed cathode substrate 136 falls off and then becomes foreign matter. In addition, because each pre-welding positive plate 230 having the projections 235T is formed by punch-pressing as mentioned above, the pre-welding positive plate 230 is easily manufactured.

According to the example embodiment, because the pre-welding cathode collector plate 260 is welded by delivering the laser beam L to the pre-welding cathode collector plate 260, the pre-welding cathode collector plate 260 and the pre-welding positive plate 230 are easily melted together down to a great depth, and thus the cathode collector plate 160 is reliably welded to the cathode collector portion 135 of each positive plate 130.

According to the pre-welding positive plate manufacturing method in the example embodiment, each pre-welding positive plate 230 having the projections 235T is formed through the pre-welding positive plate forming process (the punching process), and each projection 235T is in such a shape that the condition that S≤1.3W is satisfied. Therefore, it is possible to prevent the problem that the compressed cathode substrate 136 is detached from the metal lead plate 137 at each projection 235T and consequently part of the detached compressed cathode substrate 136 falls off and then becomes foreign matter. Further, because each pre-welding positive plate 230 has the projections 235T at the pre-welding cathode collector portion 235, the pre-welding cathode collector plate 260 is reliably welded to the pre-welding positive plates 230.

In the foregoing example embodiment, the battery pack storing the six electrode modules 120 is used as the secondary battery 100. However, for example, the secondary battery 100 may alternatively be a unit cell constructed of a battery case and a single electrode module disposed in the battery case. Further, while the electrode modules 120 are each provided as an electrode stack in which the multiple positive plates and the multiple negative plates are stacked on top of each other in the foregoing example embodiment, the electrode modules may be each provided as a rolled electrode module in which positive plates and negative plates are rolled. Further, while the laser beam L is used in the foregoing example embodiment, various other energy beams, such as electron beams, may alternatively be used. Further, various other welding methods may be used as long as the pre-welding cathode collector plate can be melted and welded to the projections of each pre-welding positive plate. The metal lead plate in the example embodiment of the invention may be, for example, a metal lead plate made of steel, nickel, etc.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A method of manufacturing a battery having an electrode module that includes: a positive plate including a cathode collector portion formed by attaching a lead member to a cathode substrate made of a foamed metal plate; and a cathode collector plate welded to the cathode collector portion of the positive plate, the method comprising:

forming a pre-welding positive plate, which is the positive plate before welding, such that the pre-welding positive plate has a projection projecting from a pre-welding cathode collector portion, which is the cathode collector portion before welding; and melting a pre-welding cathode collector plate, which is to be made the cathode collector plate by welding, so as to weld the pre-welding cathode collector plate to the projection, wherein a circumferential length of the projection is equal to or shorter than 1.3 times a width of the projection.

2. The method according to claim 1, wherein the pre-welding cathode collector plate has a recess into which at least a portion of the projection is fitted.

3. The method according to claim 1, wherein the projection is arc-shaped at least at a tip peripheral edge.

4. The method according to claim 1, wherein the lead member is attached to a compressed cathode substrate formed by compressing the foamed metal plate.

5. The method according to claim 1, wherein forming the pre-welding positive plate includes forming the pre-welding positive plate having the projection by punch-pressing a cathode base board having a support portion formed by causing a cathode active material to be supported on the foamed metal plate and an attachment portion formed by attaching an elongated metal plate on a portion of the foamed metal plate, on which the cathode active material is not supported.

6. The method according to claim 1, wherein the pre-welding cathode collector plate is welded to the projection by delivering an energy beam to the pre-welding cathode collector plate.

7. The method according to claim 1, wherein the projection is 0.1 to 0.2 mm in height.

8. A method of manufacturing a pre-welding positive plate having a pre-welding cathode collector portion formed by attaching a lead member to a cathode substrate made of a foamed metal plate, the method comprising:
   forming the pre-welding positive plate such that the pre-welding positive plate has a projection projecting from a pre-welding cathode collector portion, wherein
   a circumferential length of the projection of the pre-welding positive plate is equal to or shorter than 1.3 times a width of the projection.

9. A pre-welding positive plate, comprising a pre-welding cathode collector portion formed by attaching a lead member to a cathode substrate made of a foamed metal plate, wherein:
   a projection is provided at the pre-welding cathode collector portion; and
   a circumferential length of the projection is equal to or shorter than 1.3 times a width of the projection.

* * * * *